US012570818B2

(12) United States Patent
Stowell et al.

(10) Patent No.: US 12,570,818 B2
(45) Date of Patent: Mar. 10, 2026

(54) REACTIVE FLAME RETARDANTS FOR FLEXIBLE POLYURETHANE FOAMS

(71) Applicant: ICL-IP AMERICA INC., Tarrytown, NY (US)

(72) Inventors: Jeffrey Stowell, Wingdale, NY (US); Zhihao Chen, Floral Park, NY (US); Gerardo Francisco, Orangeburg, NY (US)

(73) Assignee: ICL-IP AMERICA INC., Tarrytown, NY (US)

( * ) Notice: Subject to any disclaimer, the term of this patent is extended or adjusted under 35 U.S.C. 154(b) by 610 days.

(21) Appl. No.: 18/009,524

(22) PCT Filed: May 14, 2021

(86) PCT No.: PCT/US2021/032414
§ 371 (c)(1),
(2) Date: Dec. 9, 2022

(87) PCT Pub. No.: WO2021/252134
PCT Pub. Date: Dec. 16, 2021

(65) Prior Publication Data

US 2023/0242727 A1 Aug. 3, 2023

Related U.S. Application Data

(60) Provisional application No. 63/037,180, filed on Jun. 10, 2020.

(51) Int. Cl.

| | |
|---|---|
| ***C07F 9/32*** | (2006.01) |
| ***C08G 18/42*** | (2006.01) |
| ***C08G 18/76*** | (2006.01) |
| ***C08J 9/00*** | (2006.01) |
| ***C08K 5/5313*** | (2006.01) |
| ***C09K 21/12*** | (2006.01) |
| *A47C 27/14* | (2006.01) |
| *A47C 31/00* | (2006.01) |
| *B60N 2/70* | (2006.01) |
| *E04B 1/84* | (2006.01) |
| *E04D 13/16* | (2006.01) |

(52) U.S. Cl.
CPC ........... *C08J 9/0038* (2013.01); *C07F 9/3264* (2013.01); *C08G 18/42* (2013.01); *C08G 18/7621* (2013.01); *C08K 5/5313* (2013.01); *C09K 21/12* (2013.01); *A47C 27/14* (2013.01); *A47C 31/001* (2013.01); *B60N 2/7017* (2013.01); *C08J 2375/06* (2013.01); *E04B 1/84* (2013.01); *E04D 13/16* (2013.01)

(58) Field of Classification Search
CPC .... C08J 9/0038; C08J 2375/06; C07F 9/3264; C08G 18/42; C08G 18/7621; C08G 18/388; C08G 18/6633; C08G 2110/0008; C08G 2110/005; C08G 2110/0083; C08K 5/5313; C08K 21/12; A47C 27/14; A47C 31/001; B60N 2/7017; E04B 1/84; E04D 13/16
See application file for complete search history.

(56) References Cited

U.S. PATENT DOCUMENTS

2019/0023873 A1 1/2019 Piotrowski et al.

FOREIGN PATENT DOCUMENTS

| | | | |
|---|---|---|---|
| EP | 2986620 | A1 | 2/2016 |
| EP | 3459957 | A1 | 3/2019 |
| WO | 2016/045976 | A1 | 3/2016 |
| WO | 2018/022496 | A1 | 2/2018 |
| WO | 2019023096 | A1 | 1/2019 |
| WO | 2019/060035 | A1 | 3/2019 |

OTHER PUBLICATIONS

Chen, Journal of Polymer Science Part A: Polymer Chemistry, vol. 37, Issue 7, Apr. 1999, p. 857-1048 (Year: 1999).*
Jiao et al., "Flame retardant epoxy resin based on bisphenol A epoxy resin modified by phosphoric acid," Journal of Thermal Analysis and Calorimetry, (2013), 114: 253-259. (Year: 2013).*
Japanese Office Action in Japanese Application No. 2022-576189 mailed Sep. 9, 2025.
Schäfer et al, Synthesis and Properties of Flame-Retardant Epoxy Resins Based on DOPO and One of Its Analog DPPO, Scientific Journal, Mar. 29, 2007, 685-696, vol. 105, Wiley Periodicals, Inc., Germany.
Chinese Office Action in Chinese Application No. 202180041548.9 dated Nov. 28, 2025.

* cited by examiner

*Primary Examiner* — K. Boyle
(74) *Attorney, Agent, or Firm* — Dilworth & Barrese, LLP; Michael J. Musella, Esq.

(57) ABSTRACT

The present invention provides reactive multi-functional dialkyl phosphinate compound(s), serving as highly efficient reactive flame retardants in flexible polyurethane foams. The invention further provides fire-retarded polyurethane compositions comprising said multi-functional dialkyl phosphinate compound and applications containing the same.

23 Claims, No Drawings

REACTIVE FLAME RETARDANTS FOR FLEXIBLE POLYURETHANE FOAMS

This application claims priority to U.S. Provisional Application No. 63/037,180 filed on Jun. 10, 2020, the entire contents of which are incorporated herein by reference.

FIELD OF THE INVENTION

The disclosure herein provides for the use of reactive dialkyl phosphorus-containing compounds, namely hydroxyl-functional esters of dialkyl phosphinic acids, which when reacted with polyol and isocyanate, serve as highly efficient reactive flame retardants in flexible polyurethane foams. The invention further provides fire-retarded flexible polyurethane foam with the aforesaid hydroxyl-functional dialkyl phosphinates reacted and incorporated into the polymer matrix of a flexible polyurethane foam. The expressions "fire retardants" and "flame retardants" are used herein interchangeably.

BACKGROUND OF THE INVENTION

Brominated or phosphorus-based flame retardants are known to be highly effective and, in many cases, are the only options for reducing the fire risk of synthetic materials such as flexible polyurethane foams. However, the growing public and governmental scrutiny of chemicals, and in particular flame retardants, has increased over the years. The goal is towards more sustainable, reactive, polymeric and/or halogen-free new products. Scrutiny greatly diminishes if a flame retardant is reacted into the polymer matrix and cannot be leached-out.

Thus, there is a demand for reactive phosphorus-containing fire retardants for flexible polyurethane possessing such features as high phosphorus content, clear light color and good compatibility with polyether polyols and polyester polyols employed in the polyurethane industry.

While mono-functional dialkylphosphinates have been used in foam, their use produces foam products with poor physical properties, e.g., poor compression set properties. In addition, mono-functional dialkylphosphinates often require that the same be blended with other phosphate esters in order to be effectively used in polyurethane foam. Further, some of the mono-functional diakylphosphinates which have previously been prepared require complicated and multi-step processes that are inefficient.

SUMMARY OF THE INVENTION

The present invention provides reactive dialkyl phosphorus-containing multi-hydroxyl-functional aromatic compounds possessing highly satisfactory flame-retarding characteristics and having good compatibility with the polyol components of a flexible polyurethane foam-forming system. The multi-functional dialkyl phosphinate compound(s) described herein when used in polyurethane foam has similar physical properties to polyurethane foam with no flame retardant present. Still further, the multi-functional dialkyl phosphinate compound(s) herein can be prepared in an efficient single-step reaction. Finally, the multi-functional dialkyl phosphinate compound(s) described herein gave excellent flame retardant properties similar to that of the mono-functional dialkyl phosphinate compounds previously used, and can be produced in a reaction mixture simultaneously with said mono-functional dialkyl phosphinates, such that further blending with such a mono-functional component for purposes of reducing viscosity is not necessary.

"Multi-functional" as used herein in the expression "multi-functional dialkyl phosphinate compound" shall be understood as comprising two or more hydroxyl groups per molecule.

The expression "a flexible polyurethane foam-forming system" as used herein shall be understood to comprise a polyol, an isocyanate and a multi-functional dialkyl phosphinate compound as described herein.

The expressions "multi-functional dialkyl phosphinate compound" and "multi-functional aromatic dialkyl phosphinate compound" are used interchangeably herein.

The mono-hydroxyl-functional dialkyl phosphinate compounds are fully reactive through their hydroxyl-functional groups. It has been surprisingly found that the multi-functional dialkyl phosphinate compound(s) herein can be reacted and incorporated into the polymer structure of a flexible polyurethane foam, e.g., by reaction with the isocyanate component of the flexible polyurethane foam-forming system, without disrupting the elastic properties of the flexible polyurethane foam. This means that the flame retardants of the invention become integrated into the flexible foam substrate, such that they are not released into the environment and are not likely to penetrate through cell membranes of living tissue, and therefore do not pose a health hazard. The invention further provides the flexible polyurethane foam-forming system described above, including but not limited to the multi-functional dialkyl phosphinate compound(s) described herein The term "foam" as used herein refers to flexible polyurethane foams. The flexible polyurethane foam described herein, or claimed herein, as comprising, consisting essentially of, or consisting of the reacted multi-functional dialkyl phosphinate compound, are all understood herein to contain the multi-functional dialkyl phosphinate compound as reactive materials, i.e., the multi-functional dialkyl phosphinate compound(s) are reacted into the flexible polyurethane material's structure, in which case the multi-functional dialkyl phosphinate compound may not be present, or would not be present in the same structural formula(e) as described herein, but would be present in the flexible polyurethane material as a reaction product with a diol and/or polyol, an isocyanate and the structural formula(e) of the multi-functional dialkyl phosphinate compound(s) described herein.

The term "polyol" as used herein will be understood as also possibly being defined as a diol and/or a polyol.

The present invention provides for a multi-functional dialkyl phosphinate compound of the general formula (I):

(I)

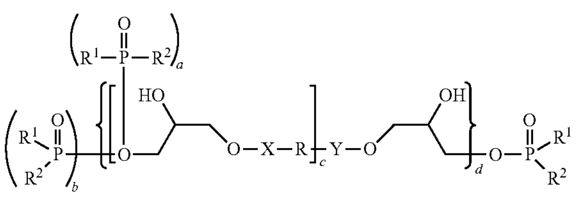

wherein each $R^1$ and $R^2$ are individually selected from an alkyl group containing from 1 to 4 carbon atoms, preferably methyl or ethyl and most preferably both being ethyl, R is a divalent linear or branched alkyl containing up to about 4 carbon atoms, a divalent aralkyl group of from 7 to 13 carbon atoms, or a bond, preferably a divalent linear or branched alkyl containing 1 to about 3 carbon atoms, more preferably a divalent methylene group or a divalent isopropyl group, X and Y are each independently a divalent aryl group containing from 6 to 12 carbon atoms, preferably from 6 to 8 carbon atoms, more preferably a divalent phenyl group, the subscripts a and b are each 0 or 1, the subscript c is an integer of from 1 to 5, and the subscript d is an integer from 1 to 26, preferably 1 to 10, most preferably from 1 to 3 with the provisos that:

$a+b=1$, when a=1, then b is 0, X is an aryl group as defined except that a hydrogen atom bonded to the aryl group is not part of the bracketed group of subscript c, and subscript c is an integer from 1 to 5 and subscript d is 1, and, when b=1, then a is 0, c is 1, and d is an integer of from 1 to 26, preferably 1 to 10, most preferably from 1 to 3

There is also provided herein a process for the preparation of the multi-functional dialkyl phosphinate compound(s) described herein comprising reacting a dialkyl phosphinic acid with an aromatic epoxide.

Further, there is provided herein a flame-retarded polyurethane foam comprising the reaction product of a polyol, an isocyanate and a flame retardant-effective amount of multi-functional dialkyl phosphinate compound of the general formula (I).

All the above and other characteristics and advantages of the invention will be better understood through the following illustrative and non-limitative detailed description of the preferred embodiments thereof.

DETAILED DESCRIPTION OF PREFERRED EMBODIMENTS

In one embodiment the multi-functional dialkyl phosphinate compound(s) of the formula (I) can be those of the more specific formulae (II) and/or (III) wherein formula (II) is:

(II)

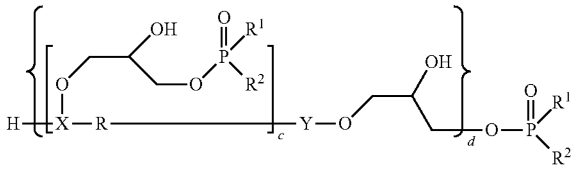

wherein $R^1$ and $R^2$ are individually selected from an alkyl group containing from 1 to 4 carbon atoms, preferably methyl or ethyl and most preferably both being ethyl, R is a divalent linear or branched alkyl containing up to about 4 carbon atoms, or a bond, preferably 1 to about 3 carbon atoms, more preferably a divalent methylene group or a divalent isopropylene group, X and Y are each independently a divalent aryl group containing from 6 to 12 carbon atoms, preferably from 6 to 8 carbon atoms, more preferably a divalent phenyl group, the subscript c is an integer of from 1 to 5, preferably 1 to 3, and the subscript d is one; and, wherein formula (III) is:

(III)

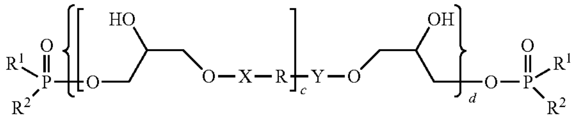

wherein $R^1$, $R^2$, R, X and Y are as defined above, and the subscript c is 1, and the subscript d is an integer of from 1 to 26, preferably 1 to 10 and most preferably 1 to 3.

Some specific examples of the above formulae (II) and (III) can comprise the following formulae (A) and (B):

(A)

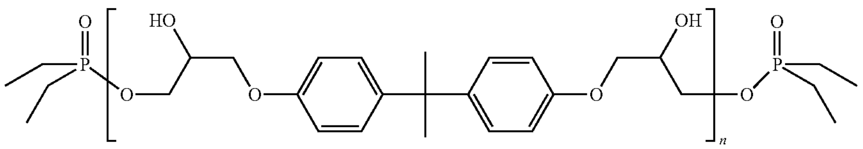

(B)

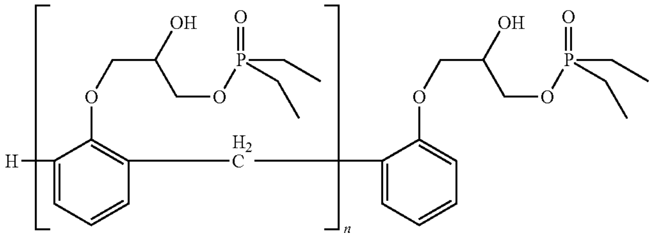

The novel compounds of formulae (I), (II) and (III), or (A) and (B) can be prepared by the reaction of mono-hydroxyl-functional-dialkyl phosphinic acids of formula (IV) with an aromatic epoxide compound, wherein formula (IV) is:

(IV)

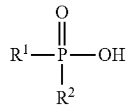

wherein $R^1$ and $R^2$ are as defined.

The dialkyl phosphinic acids (IV) employed as starting materials in the process of the present invention are for the most part well known in the art. The compounds of formula (IV) can be obtained for example by the reaction of sodium hypophosphite with ethylene, then acidification or alternatively by the reaction of hypophosphorous acid with ethylene, or less preferably by the hydrolysis of the corresponding dialkyl phosphinic halides.

The aromatic epoxide compounds can preferably be epoxy-terminated aromatic compounds. The aromatic moieties of the aromatic epoxide compounds can be as defined above for X and Y, preferably the aromatic moieties can comprise the X—R—Y portion of the general formula (I) noted above, more preferably the aromatic moieties can be derivatives of bisphenol compounds such as derivatives of bisphenol-A, bisphenol-AP, bisphenol-B, bisphenol-BP, bisphenol-C, bisphenol-E, Bisphenol-F, Bisphenol-G, 2,2'-biphenol, 4,4'-biphenol, and the like. The expression “derivatives of bisphenol compounds” will be understood by those skilled in the art to be the aromatic moiety remaining when the hydrogen atoms of two of the hydroxyl groups in the bisphenol compound are removed, such that the 0 atoms of the bisphenol compound is bound to another portion of the aromatic epoxide compound, e.g., the epoxy group and/or to a ring-opened epoxide moiety in the internal portion of the aromatic epoxide compound. Preferably, the derivative of the bisphenol compound will be a derivative of bisphenol-A or bisphenol-F.

Specific aromatic epoxides which can be used in the process for preparing the compounds of formula (I), or more specifically formulae (II) and (III), or (A) or (B) of the present invention are selected from the group consisting of, but not limited to, for example,

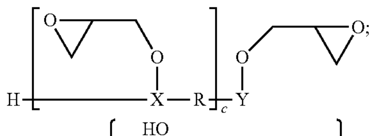

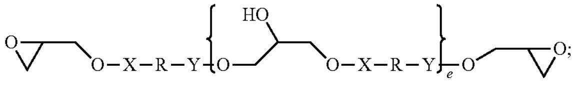

and, combinations thereof, wherein R is a divalent linear or branched alkyl containing up to about 4 carbon atoms, a divalent aralkyl group of from 7 to 13 carbon atoms, or a bond, preferably a divalent linear or branched alkyl containing 1 to about 3 carbon atoms, more preferably a divalent methylene group or a divalent isopropyl group, X and Y are each independently a divalent aryl group containing from 6 to 12 carbon atoms, the subscript c is an integer of from 1 to 5, and the subscript e is 0 or an integer of from 1 to 25, preferably 1 to 10, more preferably 1 to 3.

In a preferred embodiment of the present invention, the reaction of mono-hydroxyl-functional-dialkyl phosphinic acids (IV) with an aromatic epoxy compound is carried out in a medium of excess mono-hydroxyl-functional dialkyl phosphinic acids (IV), and wherein residual mono-hydroxyl-functional dialkyl phosphinic acid (IV), is consumed by reaction with an epoxy compound such as propylene oxide, although other epoxy compounds such as ethylene oxide, epichlorohydrin are also contemplated.

The use of propylene oxide in the process should be conducted in excess of any residual mono-hydroxyl-functional dialkyl phosphinic acid (IV), preferably a molar excess of about 1 to about 200%.

Based on the process used to make these materials, and the fact that the reactions must be completed by the final addition of propylene oxide (PO), it is possible to synthesize the multi-functional dialkyl phosphinate compound of the present invention containing a calculated amount of mono-functional dialkylphosphinate by using an excess of diethyl phosphinic acid compared to the multi-functional epoxy resin used.

The reaction of residual mono-hydroxyl-functional dialkyl phosphinic acid (IV) with an excess of epoxy compounds such as propylene oxide produces mono-functional dialkylphosphinates such as those described in U.S. Pat. No. 10,208,187 the entire contents of which are incorporated by reference herein. The amount of mono-functional dialkylphosphinate that can be produced can be set by those skilled in the art by setting the molar ratio of excess mono-hydroxyl-functional dialkyl phosphinic acids (IV) to aromatic epoxy compound(s) in an amount sufficient to produce an amount of residual mono-hydroxyl-functional dialkyl phosphinic acid (IV) sufficient to react with other epoxy compounds such as propylene oxide to produce the desired weight percent amount of mono-functional dialkylphosphinates in situ. Such a step avoids the need to blend in additional mono-functional dialkylphosphinates which is at times desired to reduce the overall viscosity of the multi-functional dialkyl phosphinate compound of the present invention.

The amount of mono-functional dialkylphosphinate that can be produced in situ as described above, and/or added to the reaction product mixture of the present invention is from about 5 wt % to about 45 wt. %, preferably from about 10 wt. % to about 40 wt. % and most preferably from about 15 wt. % to about 35 wt. % based on the total weight of mono-functional dialkylphosphinate and multi-functional dialkyl phosphinate compound of the present invention.

The viscosity of the reaction mixture (blend) of multi-functional dialkyl phosphinate compound of the present invention and the mono-functional dialkylphosphinate is preferably from about 500 cps to about 3,000 cps, more preferably from about 1,000 cps to about 2,500 cps.

The amount of mono-hydroxyl-functional-dialkyl phosphinic acid (IV) used in the reaction with aromatic epoxy compound is either a molar equivalent or if a higher amount of mono-functional content is desired, then a molar excess of mono-hydroxyl-functional-dialkyl phosphinic acid, e.g., from a 5-100% molar excess of the mono-hydroxy dialkyl phosphinic acid The temperature range for conducting the reaction of mono-hydroxyl-functional-dialkyl phosphinic acids (IV) with an aromatic epoxy compound is from about 50° C. to about 120° C., preferably from about 70° C. to about 90° C.

Such temperature ranges can be used for the subsequent reaction of epoxy compound such as propylene oxide.

The multi-functional dialkyl phosphinate compound of the present invention has a phosphorus content of about 8-15% by weight and a hydroxyl number of about 150-300 mg KOH/g, depending on the dialkyl phosphinic acid and the aromatic epoxy compound taken for the reaction.

It is preferred, for the preparation of the target multi-functional dialkyl phosphinate compound with the highest possible phosphorus content, to react mono-hydroxy-dialkyl phosphinic acids having the highest phosphorus content amongst the mono-hydroxy dialkyl phosphinic acids (IV), with aromatic epoxy compounds as described herein.

Said reactions are carried out at a temperature of between 40° C. and 120° C., and preferably between 70° C. and 90° C. At a temperature lower than 40° C. the reaction becomes unacceptably slow. On the other hand, applying a temperature higher than 120° C. is not advisable since at such temperatures undesirable decomposition products may be formed.

The multi-functional dialkyl phosphinate compounds of this invention possess high phosphorus content, have good hydrolytic and thermal stability, exhibit good compatibility with the diol and/or polyol components of a flexible polyurethane foam-forming system, and are useful as highly efficient reactive flame retardants in flexible polyurethane foams.

The compounds of the invention are useful as reactive flame retardants. The flame retardants may be used as-is, or as a mixture with halogenated or non-halogenated products. For flexible polyurethane foams it is preferred to use halogen-free hydroxyl-functional dialkyl phosphinates of the invention either pure or with other non-halogenated products.

The present invention further provides fire-retarded flexible polyurethane comprising the reactive residue of said multifunctional dialkyl phosphinates after being reacted in the flexible polyurethane foam-forming system to form the flexible polyurethane foam. The multifunctional dialkyl phosphinates compounds herein can be used in the flexible polyurethane foam-forming system either individually or in an admixture with one another, and/or with other flame retardants, including halogen-containing flame retardants and phosphorus-containing flame retardants.

In one non-limiting embodiment, the multifunctional dialkyl phosphinates herein can be combined with a monohydroxyl dialkyl phosphinate, such as the isomer mixture described herein below, wherein the alkyl moieties can be from 1-4 carbon atom alkyls, to form a composition, which can be used in the production of the polyurethane foams as described herein. The amount of the multifunctional dialkyl phosphinates can be from 1 to 40 wt. %, preferably from 1 to 30 wt. % based on the combined weight of multifunctional dialkyl phosphinates and multifunctional dialkyl phosphinates used.

The compounds of the present invention are highly efficient reactive flame retardants when incorporated into flexible polyurethane foams. It should be noted that the compounds of the invention are useful over a broad Isocyanate Index (abbreviated herein MDI or TDI). The index refers to the ratio of isocyanate practically used in the formulation vs. the theoretical stoichiometric amount of isocyanate required, expressed in percentages.

The flexible polyurethane foams herein contain a typical flame-retardant-effective amount of the composition of this invention. Typically, the compositions of this invention are applied in amounts that provide a total phosphorus concentration in the polymer (i.e., the flexible polyurethane foam) in the range of 0.01 to 10 wt %, based on the total weight of the polymer. Preferably, the total phosphorus concentration in the polymer is in the range of 0.1 to 5 wt % and more preferably, in the range of 0.1 to 3 wt %, based on the total weight of the flexible polyurethane polymer. Most preferably, the amounts used of the multi-functional dialkyl phosphinate compound(s) of this invention are at least sufficient to meet the current requirements of the flammability Test Method MVSS 302.

By suitable choice of components and conditions, the flexible polyurethane foams are made which may vary in properties as to the degree of flexibility. Thus, flexible foams are generally made from polymeric diols or triols having hydroxyl numbers of from 20 to 80 using water as the principal foaming agent.

The flexible polyurethane foams of the present invention can contain the appropriate choice of auxiliary agents, for example catalysts, surfactants, foam stabilizers and the like.

Flexible polyurethane foams as used herein is made using a diol and/or polyol having a 3,000 to about 6,000 molecular weight diol and/or polyol as described herein, e.g., a polyether triol prepared by the addition of propylene oxide to glycerol. A flexible polyurethane foam as used herein is characterized by having a core impact resilience of at most 30% and a glass transition point of from −80° C. to −60° C. Here, the flexible polyurethane foam preferably has a hard segment content of at most 40 mass %. Conventional flexible polyurethane foam having a bulk foam density of 2.5 pounds per cubic foot (PCF) or lower and having a foam hardness or IFD (measured in accordance with test method ASTM 3574-Test B1) in a range of 10 to 90 lb/50 $in^2$.

The method of making the flexible polyurethane foam of the invention can comprise combining the diol and/or polyol component and/or the isocyanate component or catalyst and one or more of the flame retardant materials of Formulae (I)-(III) or (A) or (B) as described herein which may be metered and pumped into a common mixing vessel, and then the resulting mixture may easily be moved to the polymerization site for use in molds, slab stock operations, etc.

The reactive flame retardants of the invention herein may also be admixed with the diol and/or polyol reactant before combination with the isocyanate reactant. It is also within the scope of the invention to mix the reactive flame retardant materials with the isocyanate before combining such mixture with the diol and/or polyol reactant. However, if the isocyanate and the aforementioned flame retardant materials are mixed and allowed to stand at room temperature for a substantial period of time, reaction may occur. The "reaction product" as used in the claims and specification herein, can in one embodiment comprise reacting the contents of the flexible polyurethane foam-forming system in any one of the aforementioned methods, and may further include reacting the reactive flame retardant via a pre-polymer technique, such as for example, reacting an excess of isocyanate with polyol to form an isocyanate terminated pre-polymer and then further reacting the prepolymer with the reactive flame retardant herein.

The flame retardant materials of Formulae (I)-(III) or (A) or (B) described herein may be described as isocyanate-reactive (NCO-reactive) materials, i.e., they are reactive with the isocyanates through the hydroxyl group(s).

The diols and/or polyols used in making the flexible polyurethane foams described herein can include any organic polyol, including diols, polyols, and polyether, polyester, polyesteramide polyols having hydrogen atoms that are reactive with isocyanates may be used. Generally, these materials have molecular weights ranging from about 62 to about 5,000 and have from 2 to about 10 or more hydroxyl groups per molecule and weight percent hydroxyl contents ranging from about 0.5 to about 25%. The generally have hydroxyl numbers of from about 50 to as high as 500 or even 700.

In the polyester-polyol type of reactant the acid number should be less than 10 is usually as close to 0 as possible. These materials are referred to conveniently as the "polyol" reactant. The useful active hydrogen-containing diol and/or polyols include the large family of adduct compounds which result when ethylene oxide, propylene oxide, 1,2- and 2,3-butylene oxide, or other alkylene oxides are added to such active hydrogen compounds such as diols, glycols and polyols presented by ethylene glycol, propylene glycol, glycerine, methyl glucoside, sucrose, sorbitol, hexanetriol, trimethylol propane, pentaerythritol as well as various alkylamines and alkylenediamines, and polyalkylenepolyamines and the like. Various amounts of these alkylene oxides may be added to the base diol, polyol or amine molecules referred to, depending upon the intended use of the polyurethane.

For example, a diol and/or polyol for use in making flexible foams could be well represented by glycerine to which sufficient propylene oxide was added to give a final hydroxyl content of about 1.7%. Such a material would have a molecular weight of about 3,000 and have a molar ratio of glycerine to propylene oxide of about 1 glycerine to 50 propylene oxide.

This technique of controlling flexibility by selection of the diol and/or polyol molecule and the subsequent amount of alkylene oxide added is well known to those in the art.

In addition to the glycols and the like which can serve as the base polyol molecule for addition of the alkylene oxides and thus yield the "polyol" molecule for reaction with the isocyanate, one can use a starting molecule which contains primary and/or secondary amine groups which have hydrogen reactive toward alkylene oxides. Here also, the quantity of alkylene oxide added depends on the intended uses of the final polyurethane products. In the flexible polyurethane products herein alkylene oxide would be used to produce polyols with lower hydroxyl content, such as from about 0.1% to about 5% or 10%.

Representative amines which may serve as active-hydrogen containing molecules for reaction with epoxides are those having from 1 to about 6 or more amino nitrogens, examples of which are ethyl amine, ethylene diamine, diethylenetriamine, triethylenetetramine, tetrapropylenepentamine and other linear saturated aliphatic alkylene amines, the important requirement being at least two, and preferably more, say 3 to 8 or 10 active hydrogen sites to which the alkylene oxide may be added.

It is also well known to use the hydroxyl bearing molecules which have been prepared by esterification type reactions from polyfunctional acids or anhydrides and polyfunctional alcohols as the active hydrogen compounds used in preparing the polyurethane systems. These compounds are often called polyester polyols. Typical acids used in making these polyester polyols are maleic, phthalic, succinic, fumaric, tetrahydrophthalic, chlorendic, and tetrachlorophthalic acids. Typical diols and/or polyols are ethylene, propylene, butylene, diethylene, and dipropylene, glycols, and polyethylene, polypropylene, glycols and glycerine, trimethylol propane, hexanetriol, pentaerythritol, sorbitol and the like. Where available the above mentioned acids may be used in the anhydride form if desired.

In making the polyester-polyols, any of the various polyfunctional acids or anhydrides or mixtures thereof are caused to react with any of the diols, glycols or polyols or mixtures thereof, using a stoichiometric excess of the hydroxyl groups such that the final polyol product contains predominantly hydroxyl end groups. The degree of hydroxyl functionality and the percent hydroxyl is easily varied to provide the desired polyols by technology and techniques which are known to those skilled in the art.

In the art and technology of making flexible polyurethanes, it is also known to employ what is called prepolymer techniques. This is a technique wherein part of the reaction involved in making flexible polyurethane is carried out yielding a prepolymer of increased molecular weight and with either resultant end groups of hydroxyls or isocyanates depending on the stoichiometric used in making this prepolymer. This prepolymer is then used to prepare the final flexible polyurethane product by reacting it with either a isocyanate or polyol, depending on, as mentioned above, whether the terminal groups of the prepolymer are hydroxyls or isocyanates, respectively.

Broadly, any of the prior art polyesters, isocyanate-modified-polyester prepolymers, polyesteramides, isocyanate-modified-polyesteramides, alkylene glycols, isocyanate-modified alkylene glycols, polyoxyalkylene glycols, isocyanate-modified polyoxyalkylene glycols, etc., having free reactive hydrogens and especially hydroxyl groups may be employed for the production of the polyurethanes described herein.

Examples of isocyanates which can be used include those having two or more isocyanate groups which have heretofore been used for making flexible polyurethane foams. Examples of such isocyanate compounds include aromatic isocyanates, aliphatic isocyanates and alicyclic isocyanates, as well as mixtures of two or more of such isocyanates, and modified isocyanates obtained by the modification of such isocyanates. Specific examples of such isocyanates are toluene diisocyanate, diphenylmethane diisocyanate, polymethylene polyphenylene polyisocyanate (crude MDI), xylylene diisocyanate, isophorone diisocyanate and hexamethylene diisocyanate; and modified products of such isocyanates, such as carbodiimide-modified products, biuret-modified products, dimers and trimers. Prepolymers with terminal isocyanate groups obtained from such isocyanates and active hydrogen-containing compounds can also be used.

In one embodiment, the isocyanate index range for flexible polyurethane foams can be from about 130 to about 80, more preferably, from about 120 to about 90 and most preferably from about 115 to about 95.

As the blowing agent in the flexible polyurethane foam-forming composition of the present invention, known blowing agents heretofore used in such compositions are suitably selected according to the properties required of the foamed product.

In the present invention, a cross-linking agent is also used as the case requires.

As the cross-linking agent, a compound having at least two functional groups having active hydrogen, such as hydroxyl groups, primary amino groups or secondary amino groups is preferred. However, in a case where a polyol compound is used as the cross-linking agent, the following is taken into account. Namely, a polyol compound having a hydroxyl value of at least 50 mg KOH/g and more than four functional groups, is considered to be the cross-linking agent, and a polyol which does not satisfy this, is considered to be any one of polyols of the above-mentioned polyol mixture (polyol (1), (2) or other polyol). Further, two or more cross-linking agents may be used together. As specific examples, a polyhydric alcohol such as dextrose, sorbitol or sucrose; a polyol having an alkylene oxide added to a polyhydric alcohol; an amine compound such as monoethanolamine, diethanolamine, ethylenediamine, 3,5-diethyl-2,4 (or 2,6)-diaminotoluene (DETDA), 2-chloro-p-phenylenediamine (CPA), 3,5-bis(methylthio)-2,4 (or 2,6)-diaminotoluene, 1-trifluoromethyl-4-chloro-3,5-diaminobenzene, 2,4-toluenediamine, 2,6-toluenediamine, bis(3,5-dimethyl-4-aminophenyl)methane, 4,4'-diaminodiphenylmethane, m-xylylenediamine, 1,4-diaminohexane, 1,3-bis(aminomethyl)cyclohexane or isophoronediamine; and a compound obtained by adding an alkylene oxide thereto, may, for example, be mentioned.

When the above cross-linking agent is used, even in a case where, for example, a large amount of a blowing agent is used to produce a flexible foam having a low density, the foaming stability will be good, and it will be possible to produce such a flexible foam. Especially when a diol and/or polyol having a high-molecular weight is used, it is possible to produce a flexible foam having a low density which used to be considered difficult to foam. Further, when the cross-linking agent is used, the durability will be improved, as compared with a case where it is not used. In a case where a diol and/or polyol having a high-molecular weight is used as in the present invention, the foaming stability can readily be improved particularly when a compound having a relatively high-molecular weight, such as a molecular weight of at least 4000, is used.

Water is a typical example of such a blowing agent; other examples include methylene chloride, acetone, carbon dioxide, and the like. Depending on the desired density and other properties of the foamed polyurethane, these and other blowing agents can be used alone or in combinations of two or more in a manner known in the art.

The amount of blowing agent to be used is not particularly limited but will ordinarily range from 0.1 to 20 parts by weight per 100 parts by weight of the diol and/or polyol component of the foam-forming composition. Preferably, the amount of blowing agent(s) will be such as to provide a foam density of from 0.8 to 2.5 pounds per cubic foot, and preferably from 0.9 to 2.0 pounds per cubic foot.

The polyurethane foam-forming composition herein can preferably contain any of the catalysts, and combination of catalysts, heretofore known or used for the production of polyurethane foams. Examples of useful catalysts include sodium hydroxide, sodium acetate, tertiary amines or materials which generate tertiary amines such as trimethylamine, triethylene diamine, N-methyl morpholine, N, N-dimethyl cyclohexylamine, and N, N-dimethyl aminoethanol. Also applicable are metal compounds such as hydrocarbon tin alkyl carboxylates, dibutyl tin diacetate, dibutyl tin dioctoate dibutyl tin dilaurate and stannous octoate; as well as other compounds intended to promote trimerization of the isocyanate such as, 2,4,6-tris(N,N-dimethylamino-methyl)phenol, 1,3,5-tris(N,N-dimethyl-3-aminopropyl)-S-hexahydrotriazine, potassium octoate, potassium acetate and catalysts such as DABCO TMR® and POLYCAT 43®.

Many other kinds of catalysts can be substituted for those listed above, if desired. The amount of catalyst used can advantageously range from 0.05 to 5 weight percent or more based on the total weight of diol and/or polyol in the foam-forming mixture.

The isocyanate (NCO) index which is applied in making the flexible foam according to the present invention is 95-125 and preferably 100-120. It is commonly understood that the NCO index of polyurethane foams is from about 80-130.

The densities of the flexible polyurethane foams herein may range of from 14-80 and preferably 16-55 and most preferably 20-40 kg/$m^3$.

Surfactants, including organic surfactants and silicone-based surfactants, may be added to serve as cell stabilizers. Some representative materials are sold under the designations SF-1109, L-520, L-521 and DC-193, which are, generally, polysiloxane polyoxylalkylene block copolymers. Also included are organic surfactants containing polyoxyethylene-polyoxybutylene block copolymers. It is particularly desirable to employ a minor amount of a surfactant to stabilize the foaming reaction mixture until it cures. Other surfactants that may be useful herein are polyethylene glycol ethers of long-chain alcohols, tertiary amine or alkanolamine salts of long-chain allyl acid sulfate esters, alkylsulfonic esters, alkyl arylsulfonic acids, and combinations thereof. Such surfactants are employed in amounts sufficient to stabilize the foaming reaction against collapse and the formation of large uneven cells. Typically, a surfactant total amount from about 0.2 to about 3 wt %, based on the formulation as a whole, is sufficient for this purpose. However, it may be in some embodiments desirable to include some surfactants, e.g., DABCO DC-5598, available from Air Products and Chemicals, Inc., in a higher amount. In view of this a surfactant may be included in the inventive formulations in any amount ranging from 0 to 6 wt. %, based on the diol and/or polyol component.

Finally, other additives such as fillers and pigments may be included in the polyurethane foam-forming formulations described herein. Such may include, in non-limiting embodiments, barium sulfate, calcium carbonate, graphite, carbon black, titanium dioxide, iron oxide, microspheres, alumina trihydrate, wollastonite, prepared glass fibers (dropped or continuous), polyester fibers, other polymeric fibers, combinations thereof, and the like. Those skilled in the art will be aware without further instruction as to typical and suitable means and methods to adapt the inventive formulations to produce flexible polyurethane foams that, though still falling within the scope of the claims appended hereto, exhibit or benefit from desired property and/or processing modifications.

The flexible polyurethane foams described herein, be they be can be utilized in the construction and formation of various articles such as furniture, bedding, and automotive seat cushions, more specifically, furniture applications, automotive applications, boating applications, bus seating applications, train seating applications, RV seating applications, office furniture seating applications, aviation applications, tractor applications, bicycle applications, engine mount applications, compressor applications, bedding applications, insulation applications, sporting goods applications, shoe applications, carpet cushioning applications, packaging applications, textile applications, buffer cushioning applications, HVAC applications, tent applications, life raft applications, luggage applications, and hand bag applications.

Flexible slabstock polyurethane foam can be used for furniture, e.g., upholstered furniture, such as cushions, backs and arms, the automotive industry, such as seat and back cushions, and head linings and head rests, for automobiles and trucks, for public transport seating, such as busses and airplanes, as well as in any of tractor, bicycle and motorcycle seats including, but not limited to vehicle seat bottom and back bolsters, and armrests, as well as support rings for run flat tires, and other automobile interior components; bedding such as mattresses, as sound insulation materials, automobile interior components such as an arm rest, a steering wheel and a shift lever knob, shoe soles, and sporting goods.

EXAMPLES

Seven different reaction products of epoxides with diethyl phosphinic acid (DEPA) were prepared and evaluated as flame retardant additives for flexible polyurethane foam. Example structures of the molecules prepared are given below:

Bisphenol A Diglycidyl Ether Phosphinate Ester Reaction Product (from DER 331, 332 &

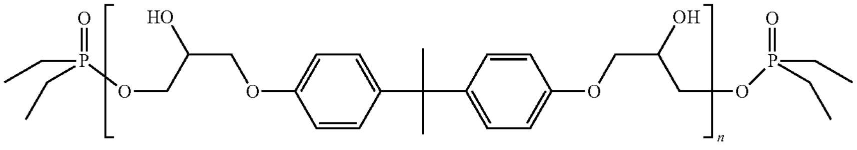

Comparative Compound 1: Neopentyl Glycol Diglycidyl Ether Phosphinate Ester Reaction Product (from Araldite DY-N)

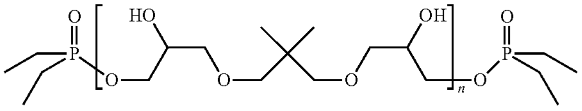

The n value for the above product can be calculated similar to the method noted above for DER products. DY-N has an EEW of 125-145 grams, with pure diglycidyl etherbeing 108.14 grams EEW. DY-N will thus have a n value of ~1.25.

The n values for the epoxy resins DER 331, DER 332 and DER 383 can be calculated based on the given epoxy equivalent weights (EEW), which is the weight associated with each epoxy group in the molecule. Each molecule of DER 331, DER 332 and DER 383 has two epoxy groups. The EEW for DER 331 is in a range of 182-192 grams. The EEW for the pure diglycidylether of bisphenol A is 170.2 grams, therefore the n value for DER 331 is ~1.10 if one employs a 187-average value for DER 331. DER 332 EEW is 171-175, so the calculated n=~1.02 and DER 383 EEW is 176-183, so the calculated n value is ~1.05.

Epoxy Novolac Resin Phosphinate Ester Reaction Product (from DEN 431):

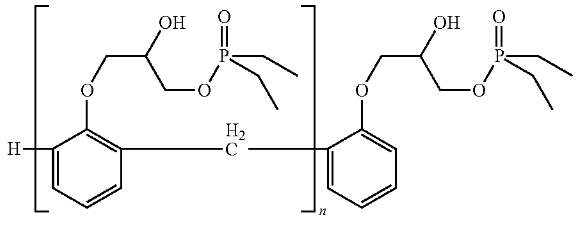

The same calculation method noted above for DER 331, DER 332 and DER 383 to determine n cannot be used for the DEN oligomers since almost every phenyl group has one epoxy group no matter the length of the oligomer. Pure Novolac resin where every phenyl has an epoxy group would have an EEW of 150.17 grams, where DEN 431 has an EEW of 172-179 grams. Therefore, not every phenyl moiety has an epoxy group. The n value is not able to be calculated for these products, the manufacturer's n value or DEN 431 ~1.8.

Comparative Compound 2: 1,4-Butanediol Diglycidyl Ether Phosphinate Ester Reaction Product (from Araldite DY-D)

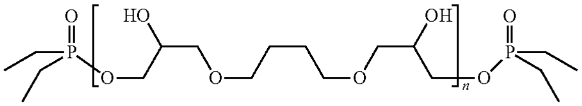

DY-D has an EEW of 117-125 grams, with pure diglycidyl ether being 101.12 grams EEW. Thus, DY-D has an n value of ~1.20.

Comparative Compound 3: Trimethylolpropane Triglycidyl Ether Phosphinate Ester Reaction Product (from Araldite DY-T)

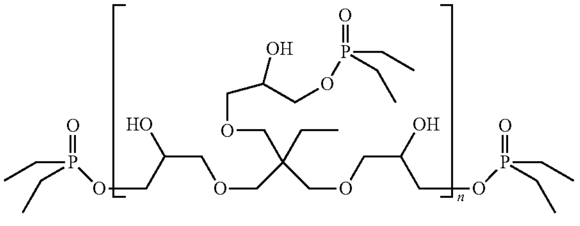

DY-T has an EEW of 111-143 grams, with pure triglycidyl ether being 100.79 grams EE, DY-T will have a n value of ~1.26.

The molecules were prepared using the generic synthetic scheme below:

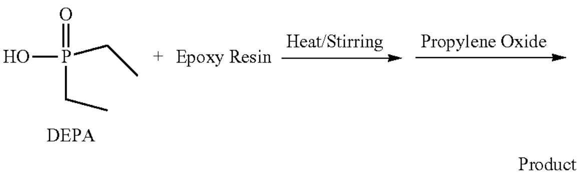

SYNTHETIC EXAMPLES

Synthetic Example 1

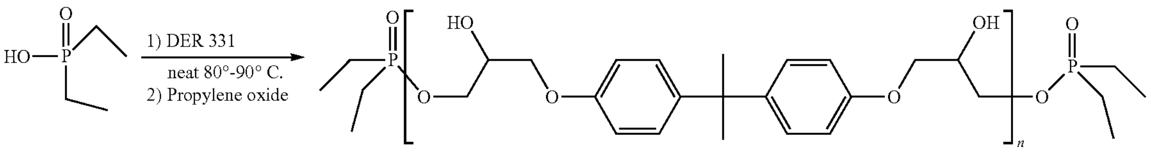

wherein n is ~1.10

Procedure:

A 0.5-liter 4 neck round bottom flask equipped with water condenser, a J-Kem temperature a probe, an addition funnel, and a magnetic stirrer was charged with DER 383 (139.4 grams). The batch was heated to 60° C. and then stirred at this temperature. The batch was then added with diethyl phosphonic acid (100 grams; 0.819 mole) via addition funnel. A slight exotherm was observed up to 66° C. The batch was stirred at 80° C. and held at this temperature for 3.0 hours and then at 90° C. for 4.0 hours. The batch was cooled to room temperature overnight without stirring.

The batch was then heated to 40° C. and propylene oxide (32.0 grams; 0.55 mole) was added portion wise with a water condenser attached to the flask. After the addition of PO, the batch was stirred at 80° C. for 8.0 hours. A sample was taken for acid number analysis as batch and gave an acid number=0.53 mg KOH/g. The batch was the vacuum stripped at 80° C. under full vacuum for 2 hours to give a clear glass compound.

The analytical results were:

Acid number=0.05 mg KOH/g

Water=990 ppm

OH number=202 mg KOH/g

Synthetic Example 2

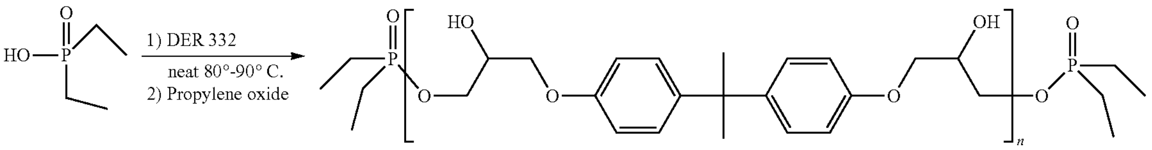

wherein n is ~1.02

Procedure:

A 0.5-liter 4 neck round bottom flask equipped with a water condenser, a J-Kem temperature probe, an addition funnel, and a magnetic stirrer was charged with DER 332 (139.4 grams). The batch was heated to 60° C. and then stirred at this temperature. The batch was then added with diethyl phosphinic acid (100 grams; 0.819 mole) via addition funnel. A slight exotherm was observed up to 63° C. The batch was stirred at 80° C. and held at this temperature for 3.0 hours and then at 90° C. for 7.0 hours. The batch was then cooled to room temperature overnight without stirring.

The batch was then heated to 40° C. and propylene oxide (32.0 grams; 0.55 mole) was added portion wise with a water condenser attached to the flask. After the addition of PO, the batch was stirred at 80° C. for 8.0 hours. A sample was taken for acid number analysis to give an acid number=0.44 mg KOH/g. The batch was the vacuum stripped at 90° C. under full vacuum for 2 hours to give a clear glass compound.

The analytical results were:

Acid number=0.03 mg KOH/g

Water=930 ppm

OH number=197 mg KOH/g

Synthetic Example 3

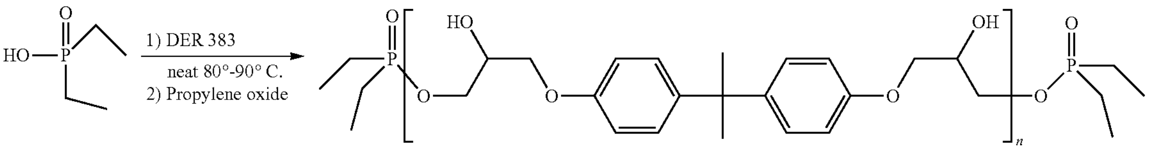

wherein n is ~1.05

Procedure:

A 0.5-liter 4 neck round bottom flask equipped with a water condenser, a J-Kem temperature probe, an addition funnel and a magnetic stirrer was charged with DER 383 (139.4 grams). The batch was heated to 60° C. and then stirred at this temperature. The batch was then added with diethyl phosphonic acid (100 grams; 0.819 mole) via addition funnel. A slight exotherm was observed up to 61° C. The batch was stirred at 80° C. and held at this temperature for 3.0 hours and at 90° C. for 9.0 hours. The batch was cooled to room temperature overnight without stirring.

The batch was heated to 40° C. and propylene oxide (16.0 grams; 0.275 mole) was added portion wise with a water condenser attached to the flask. After the addition of PO, the batch was stirred at 80° C. for 3.0 hours and at 90 C for 4 hours. A sample was taken for acid number analysis to give an acid number=0.48 mg KOH/g. The batch was the vacuum stripped at 90° C. under full vacuum for 2 hours to give a clear glass compound.

The analytical results were:

Acid number=0.02 mg KOH/g

Water=450 ppm

OH number=192 mg KOH/g

Synthetic Example 4

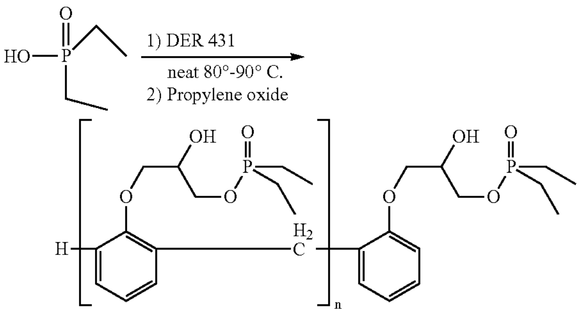

wherein n is ~1.8

Procedure:

A 0.5-liter 4 neck round bottom flask equipped with a water condenser, a J-Kem temperature probe, an addition funnel, and a magnetic stirrer was charged with DEN 431 (139.4 grams). The batch was heated to 60° C. and then stirred at this temperature. Diethyl phosphinic acid (100 grams; 0.819 mole) was then added via an addition funnel. A slight exotherm was observed up to 62° C. The batch was then stirred at 80° C. and held at this temperature for 3.0 hours and then at 90° C. for 9.0 hours. The batch was then cooled to room temperature.

The batch was heated to 40° C. and propylene oxide (16.0 grams; 0.275 mole) was added portion wise with a water condenser attached to the flask. After the addition of PO, the batch was stirred at 80° C. for 3.0 hours and then at 90 C for 4 hours. A sample was taken for acid number analysis and gave an acid number=0.34 mg KOH/g. The batch was then vacuum stripped at 90° C. under full vacuum for 2 hours to give a clear glass compound.

The analytical results were:

Acid number=0.03 mg KOH/g

Water=2300 ppm

OH number=205 mg KOH/g

The following table 1 summarizes analytical results for the 4 inventive synthetic examples and the three comparative structures:

TABLE 1

| Reactants | | Product | | |
|---|---|---|---|---|
| | | Acid #, | OH #, | |
| Example | Epoxy | mg KOH/g | mg KOH/g | Water, ppm |
| Synthetic Example 1 | DER331 | 0.05 | 202 | 990 |
| Synthetic Example 2 | DER332 | 0.03 | 197 | 930 |
| Synthetic Example 3 | DER383 | 0.02 | 199 | 450 |
| Synthetic Example 4 | DEN431 | 0.03 | 205 | 2300 |
| Comparative Compound 1 | A. DY-N | 0.03 | 339 | 1099 |
| Comparative Compound 2 | A. DY-D | 0.04 | 348 | 740 |
| Comparative Compound 3 | A. DY-T | 0.08 | 403 | 1470 |

The products listed above were then evaluated as flame retardant additives in polyester polyol polyurethane flexible foam. Due to the higher viscosity of the aromatic epoxy products (made from the aromatic epoxy resins-Synthetic Examples 1-4), these materials were also below evaluated in blends with a mono-functional low viscosity phosphinate ester (MFPE) product, which is a mixture of the isomers shown below:

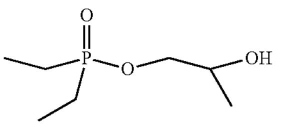

+

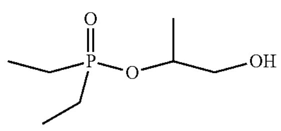

based on similar chemistry as set out in the formulations of Table 3. The aliphatic epoxy products (Comparative Compounds 1-3) were only evaluated neat since their lower viscosities made them easier to use in the polyurethane formulations and would not benefit from dilution with the above noted MFPE isomer mixture. The results from the first round of evaluations as neat products are shown in Table 2 below:

TABLE 2

| | Application Example 1 | Application Example 2 | Application Example 3 | Application Example 4 | Comparative Application Example 1 | Comparative Application Example 2 | Comparative Application Example 3 |
|---|---|---|---|---|---|---|---|
| Flame Retardant obtained from Synthetic Example or Comparative Structure | Synthetic Example 1 | Synthetic Example 2 | Synthetic Example 3 | Synthetic Example 4 | Comparative Compound 1 | Comparative Compound 2 | Comparative Compound 3 |
| DG173RLF | 100 | 100 | 100 | 100 | 100 | 100 | 100 |
| Synthetic Example 1 | 6 | | | | | | |
| Synthetic Example 2 | | 6 | | | | | |
| Synthetic Example 3 | | | 6 | | | | |
| Synthetic Example 4 | | | | 6 | | | |
| Comparative Compound 1 | | | | | 4 | | |
| Comparative Compound 2 | | | | | | 4 | |
| Comparative Compound 3 | | | | | | | 4 |
| Niax C-131 NPF | 1.1 | 1.1 | 1.1 | 1.1 | 1.1 | 1.1 | 1.1 |
| Niax DMP | 0.2 | 0.2 | 0.2 | 0.2 | 0.2 | 0.2 | 0.2 |
| Niax L-537XF | 1.3 | 1.3 | 1.3 | 1.3 | 1.3 | 1.3 | 1.3 |
| Water | 4 | 4 | 4 | 4 | 4 | 4 | 4 |
| TDI 65 | 29.4 | 29.4 | 29.4 | 29.4 | 29.5 | 29.5 | 29.7 |
| TDI 80 | 19.6 | 19.6 | 19.6 | 19.6 | 19.7 | 19.7 | 19.7 |
| Index | 98 | 98 | 98 | 98 | 98 | 98 | 98 |
| Observations | | | | | | | |
| Cream time | 7 | 7 | 7 | 7 | 7 | 6 | 6 |
| Blow off/End of Rise | 57 | 60 | 63 | 66 | 57 | 47 | 47 |
| Notes | XL Cell Size | Good Foam | Good Foam | FR-Mixing Problem | Unpleasant Odor | Quick Reaction | XL Cell, Boiling |
| Physical Performance | | | | | | | |
| Density, lb/ft$^3$ | 1.60 | 1.88 | 1.75 | — | 1.90 | 1.80 | — |
| Air Flow, cfm | 0.8 | 0.9 | 0.3 | — | 0.3 | 0.5 | — |
| 90% Compression set, % | — | 62 | 57 | — | 82 | 78 | — |
| MVSS 302, SE rating <38 mm | — | SE (24) | SE (24) | — | SE (31) | SE (30) | — |

Density is determined by ASTM D3574 (2003) Test A, Density Test

Air Flow is measured by ASTM D3574 (2003) Test G, Air Flow Test

Compression set is measured by standard ASTM method D 3574-03 Test D and is used to determine ability of foam to recover after being compressed. Applicant employed a compression of 90%, mentioned in line 41.3 of the standard in the evaluations noted. This test method consists of deflecting the foam specimen to a specified deflection, exposing it to specified conditions of time and temperature and measuring the change in the thickness of the specimen after a specified recovery period.

DG173RLF is a polyester polyol available from C.O.I.M. s,p,a—Chimica Organica Industriale Milanese as DIEXTER G 173 RLF Niax C131 NPF is Bis(2-dimethylaminoethyl) ether; 3-Dimethylamino-N,N-dimethylpropionamide available from Momentive Performance Materials GmbH (CAS 3033-62-3 17268-47-2)

Niax DMP is N,N'-Dimethylpiperazine available from Momentive Performance Materials GmbH (CAS 106-58-1)

Niax Silicone L537LF is Polyalkyleneoxidemethylsiloxane copolymer available from Momentive Performance Materials.

TDI 65 is an aromatic isocyanate available from Covestro, LLC as MONDUR TD-65 (CAS 584-84-9 (65%), 91-08-7 (35%)).

TDI 80 is an aromatic isocyanate available from Everchem Specialty Chemicals as TDI 80 Type 1 ISOCYANATE (CAS 584-84-9 (80%); 91-08-7 (20%))

The neat products (i.e., the products from Synthetic Examples 1-4) were glassy materials at room temperature, while the comparative products (Comparative Compounds 1-3) were medium viscosity liquids (similar to Fyrol FR-2, i.e., Tris(1,3-dichloro-2-propyl) phosphate (TDCP)). In this first round of evaluations, it was necessary to heat the products from Synthetic Examples 1-4 to 90° C. in order to pour them. The seven phosphinate test compounds were slowly added to the polyol together with the other polyurethane formulation ingredients. In the case of the products of Synthetic Examples 1-4, once they encountered the polyol at a lower temperature, they thickened and there was difficulty getting the materials incorporated into the formulation mixture. Addition of the Comparative Compounds 1-3 to the polyol and other formulation chemicals went smoothly without issue. Although some of the foams using the products of Synthetic Examples 1-4 yielded good results, difficulty handling the materials at room temperature led to the conclusion that use of these high viscosity products will be a challenge in a commercial setting.

As mentioned above it was a challenge to prepare foams utilizing the neat products of Synthetic Examples 1-4, but for the materials that did mix into the formulation and resulted in acceptable foam, the flammability and physical properties were advantageous. At 6 pph loading in the formulation the products from Synthetic Examples 2 and 3 gave a SE rating in the MVSS 302 and compression set numbers comparable to non-flame retarded foam. These results were unexpected given all phosphinate ester products based on diethyl phosphinic acid chemistry have previously been found to negatively affected the compression set properties of the flexible foams made. The combination of good flame retardant results and good physical properties of the foams made with the products from Synthetic Examples 2 and 3 demonstrate the commercial advantage of these products.

Foam evaluations with the aliphatic products (Comparative Compounds 1-3) did not achieve the positive results compared to the aromatic-based epoxy products of Synthetic Examples 1-4. While it was possible to prepare foam with the Comparative Compounds 1-3, they had a negative effect on the compression set properties of the foams similar to monofunctional diethyl phosphinate ester products. A loss in height of 70-80% during the 90% compression set test would be considered unacceptable for a commercial foam. All three products of Comparative Compounds 1-3 catalyzed the foaming reaction, causing a very quick reaction and shortened the end of rise time to different degrees. The Comparative Compounds 2 and 3 were much faster than the Comparative Compound 1.

One additional concern related to the Comparative Compound 1 product was the unpleasant odor imparted to the foam product. Given end use applications for flexible foam almost always involved close contact to customers in limited spaces (e.g., automotive, furniture), it is not likely this product will be accepted with such an odor. Finally, the Comparative Compound 3 product, that is trifunctional (three OH groups), created an instability during the foaming process and therefore could not be used to make flexible foam. The product destabilized the foam and caused the foam mixture to boil versus expanding in a normal fashion. It is possible the high OH functional nature of the product, combined with the inherent catalytic affect these phosphinates have during the foaming process were contributing factors for why this product did not work. In summary, none of the aliphatic epoxy-based Comparative Compounds 1-3 products yielded acceptable flexible foam products.

TABLE 3

| | Blend Example 1 | Blend Example 2 | Blend Example 3 | Blend Example 4 | Blend Example 5 | Blend Example 6 | Blend Example 7 | Blend Example 8 |
|---|---|---|---|---|---|---|---|---|
| FR Blend Used | Syn. Ex. 1/ MFPE | Syn Ex. 2/ MFPE | Syn. Ex. 3/ MFPE | Syn. Ex. 4/ MFPE | Syn Ex. 2/ MFPE | Syn. Ex. 3/ MFPE | Syn Ex. 2/ MFPE | Syn. Ex. 3/ MFPE |
| Blend Ratio | 70/30 | 70/30 | 70/30 | 70/30 | 60/40 | 60/40 | 60/40 | 60/40 |
| DG173RLF | 100 | 100 | 100 | 100 | 100 | 100 | 100 | 100 |
| Syn. Ex. 1/ MFPE | 5 | | | | | | | |
| Syn. Ex. 2/ MFPE | | 5 | | | | | | |
| Syn Ex, 3/ MFPE | | | 5 | | | | | |
| Syn. Ex. 4/ MFPE | | | | 5 | | | | |
| Syn. Ex. 2/ MFPE | | | | | 5 | | | |
| Syn. Ex. 3/ MFPE | | | | | | 5 | | |
| Syn. Ex. 2/ MFPE | | | | | | | 3 | |
| Syn. Ex. 3/ MFPE | | | | | | | | 3 |
| Niax C-131 NPF | 1.1 | 1.1 | 1.1 | 1.1 | 1.1 | 1.1 | 1.1 | 1.1 |
| Niax DMP | 0.2 | 0.2 | 0.2 | 0.2 | 0.2 | 0.2 | 0.2 | 0.2 |
| Niax L-537XF | 1.3 | 1.3 | 1.3 | 1.3 | 1.3 | 1.3 | 1.3 | 1.3 |
| Water | 4 | 4 | 4 | 4 | 4 | 4 | 4 | 4 |
| TDI 65 | 28.7 | 28.7 | 28.7 | 28.7 | 29.4 | 29.4 | 29.0 | 29.0 |
| TDI 80 | 19.1 | 19.1 | 19.1 | 19.1 | 19.6 | 19.6 | 19.3 | 19.3 |
| Index | 98 | 98 | 98 | 98 | 98 | 98 | 98 | 98 |
| Observations | | | | | | | | |
| Cream time | 7 | 7 | 7 | 7 | 7 | 7 | 7 | 7 |
| Blow off/ End of Rise | 56 | 56 | 56 | 56 | 58 | 56 | 60 | 58 |
| Notes | Good Foam | Best Foam | Best Foam | Good Foam | — | — | — | — |
| Physical Performance | | | | | | | | |
| Density, lb/ft$^3$ | 1.80 | 1.81 | 1.84 | 1.81 | 1.89 | 1.85 | 1.82 | 1.83 |
| Air Flow, cfm | 1.4 | 1.3 | 0.7 | 1.2 | 1.2 | 1.0 | 1.5 | 0.6 |
| 90% Compression set, % | 42 | 53 | 62 | 48 | 64 | 68 | 54 | 63 |
| MVSS 302, SE Rating <38 mm | SE (28) | SE (22) | SE (23) | SE (24) | SE (23) | SE (22) | SE (34) | SE (31) |

A second round of application testing was completed using the Synthetic Examples 1-4 products to create versions of the products that were more amenable to being handled and poured at room temperature. The approach taken was to blend each of the products from Synthetic Examples 1-4 with the low viscosity phosphinate ester product MFPE in enough of a ratio to make the product viscosity reasonable, but no more than needed since the MFPE product is known to cause disruption to the physical properties of foam products. The following data set in Table 3 was generated using 30% and 40% added MFPE.

General observations on the 30/70 blends were that the viscosities were acceptable, and the blends could be poured and used at room temperature without issue. A loading of 5 pph for all the blends at this ratio in the foam formulation gave a strong SE rating in the MVSSS 302 test with little impact on the compression set properties of the foams. The Syn. Ex. 2 and Syn. Ex. 3 products, in terms of final foam quality, preformed the best at this ratio and were picked for an additional round of testing with an alternative blend ratio with MFPE. To further reduce viscosity, MFPE was blended with Syn. Ex. 2 and Syn. Ex. 3 at a 40/60 ratio (see Blend Examples 5-8). At this new ratio, both products gave a strong SE rating in the MVSS 302 test at 5 pph, and even a borderline SE rating at only 3 parts. It was therefore concluded that a loading of 4 parts of each blend would be the ideal loading for a reliable SE rating in the MVSS 302 for these blends. However, introducing more MFPE in the blend did show evidence of a negative impact on the compression set values for the foams made with this blend. The percent loss in recovery did show some increase from the 30/70 blends. While not wishing to be bound by theory, it may be that the 40% MFPE blend could be the practical limit for how much of this low viscosity diluent can be added to the Synthetic Example 2 and 3 products to achieve acceptable handling properties without sacrificing the physical properties of the foam products.

In summary, Synthetic Example Products 2 and 3 are the most desirable candidates for future development when blended with a maximum of 40% MFPE (preferably 30%) to provide a usable viscosity reactive phosphinate ester blend that has excellent FR properties, good physical foam properties and zero VOC emissions from the foam due to the reactive nature of the multifunctional aromatic phosphinate and MFPE products. The aromatic epoxy-based products showed superior performance properties to the aliphatic epoxy-based products in both foam making properties and the performance of the final foams prepared. The negative characteristic associated with the viscosity of the Synthetic Example 1-4 products can be overcome by blending with additional MFPE (which is already present in the product at 5-6 wt. %, resulting from the final process finishing step using propylene oxide). Based on the process used to make these materials, and the fact that the reactions must be completed by the final addition of propylene oxide (PO), it is possible to synthesize the Synthetic Example 1-4 products containing a calculated amount of MFPE by using an excess of diethyl phosphinic acid compared to the diepoxy resin used. The resulting blends can provide a relatively low viscosity, high efficiency flame retardant, which is phenol free, has zero emission, is a fully reactive flame retardant with minimum compression set loss in the final foam product.

While the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention but that the invention will include all embodiments falling within the scope of the appended claims.

The invention claimed is:

1. A multi-functional dialkyl phosphinate compound of the general formula (I):

(I)

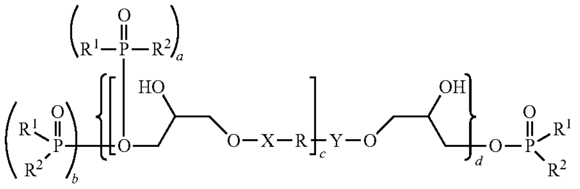

wherein each $R^1$ and $R^2$ are individually selected from an alkyl group containing from 1 to 4 carbon atoms, R is a divalent linear or branched alkyl containing up to about 4 carbon atoms, a divalent aralkyl group of from 7 to 13 carbon atoms, or a bond, X and Y are each independently a divalent aryl group containing from 6 to 12 carbon atoms, the subscripts a and b are each 0 or 1, the subscript c is an integer of from 1 to 5, and the subscript d is an integer from 1 to 26, with the provisos that:

$$a+b=1,$$

when a=1, then b is 0, X is an aryl group as defined except that a hydrogen atom bonded to the aryl group is not part of the bracketed group of subscript c, and subscript c is an integer from 1 to 5 and subscript d is 1, and, when b=1, then a is 0, c is 1, and d is an integer of from 1 to 26.

2. The multi-functional dialkyl phosphinate compound of claim 1, wherein $R^1$ and $R^2$ are each an ethyl group.

3. The multi-functional dialkyl phosphinate compound of claim 1, wherein X and Y are each a divalent phenyl group and R is either a divalent methyl group or a divalent isopropyl group.

4. The multi-functional dialkyl phosphinate compound of claim 1, which has the general formula (II):

(II)

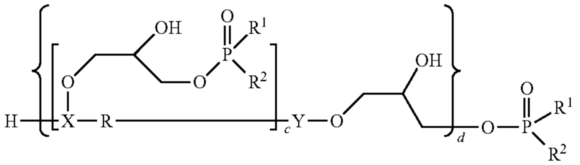

wherein $R^1$ and $R^2$ are individually selected from an alkyl group containing from 1 to 4 carbon atoms, R is a divalent linear or branched alkyl containing up to about 4 carbon atoms, or a bond, X and Y are each independently a divalent aryl group containing from 6 to 12 carbon atoms, the subscript c is an integer of from 1 to 5, and the subscript d is one.

5. The multi-functional dialkyl phosphinate compound of claim 1, which has the general formula (III):

(III)

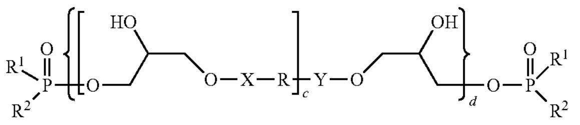

wherein $R^1$ and $R^2$ are individually selected from an alkyl group containing from 1 to 4 carbon atoms, R is a divalent linear or branched alkyl containing up to about 4 carbon atoms, or a bond, X and Y are each independently a divalent aryl group containing from 6 to 12 carbon atoms, the subscript c is 1, and the subscript d is an integer of from 1 to 26.

6. A process of making a multifunctional dialkyl phosphinate compound comprising reacting a dialkyl phosphinic acid with an aromatic epoxide.

7. The process of claim 6, wherein the aromatic epoxide is selected from the group consisting of:

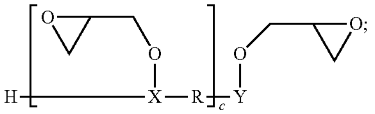

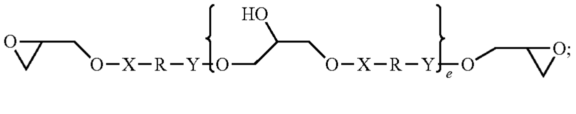

and, combinations thereof, wherein R is a divalent linear or branched alkyl containing up to about 4 carbon atoms, or a bond, X and Y are each independently a divalent aryl group containing from 6 to 12 carbon atoms, the subscript c is an integer of from 1 to 5, and the subscript e is 0 or an integer of from 1 to 25.

8. The process of claim 6, wherein the dialkylphosphinic acid is present in a molar excess to aromatic epoxide, which results in an excess of dialkylphosphinic acid which is subsequently reacted with an epoxy compound in situ to produce a blend of multi-functional dialkyl phosphinate compound and mono-functional dialkylphosphinate.

9. A flame-retarded polyurethane foam comprising the reaction product of a polyol, an isocyanate and a flame retardant-effective amount of multi-functional dialkyl phosphinate compound of the general formula (I):

(I)

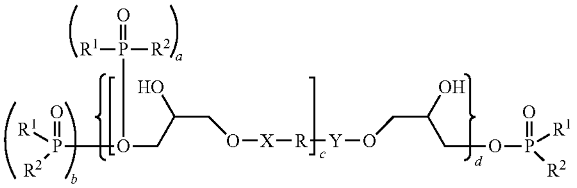

wherein each $R^1$ and $R^2$ are individually selected from an alkyl group containing from 1 to 4 carbon atoms, R is a divalent linear or branched alkyl containing up to about 4 carbon atoms, a divalent aralkyl group of from 7 to 13 carbon atoms, or a bond, X and Y are each independently a divalent aryl group containing from 6 to 12 carbon atoms, the subscripts a and b are each 0 or 1, the subscript c is an integer of from 1 to 5, and the subscript d is an integer from 1 to 26, with the provisos that:

$$a+b=1,$$

when a=1, then b is 0, X is an aryl group as defined except that a hydrogen atom bonded to the aryl group is not part of the bracketed group of subscript c, and subscript c is an integer from 1 to 5 and subscript d is 1, and, when b=1, then a is 0, c is 1, and d is an integer of from 1 to 26.

10. The flame-retarded polyurethane foam of claim 9, wherein $R^1$ and $R^2$ are each ethyl, X and Y are each a divalent phenyl group, and R is either a divalent methyl group or a divalent isopropyl group.

11. The flame-retarded polyurethane foam of claim 9, wherein the multi-functional dialkyl phosphinate compound has the general formula (II):

(II)

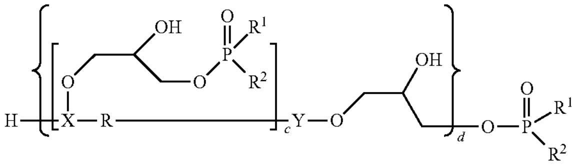

wherein $R^1$ and $R^2$ are individually selected from an alkyl group containing from 1 to 4 carbon atoms, R is a divalent linear or branched alkyl containing up to about 4 carbon atoms, or a bond, X and Y are each independently a divalent aryl group containing from 6 to 12 carbon atoms, the subscript c is an integer of from 1 to 5, and the subscript d is one.

12. The flame-retarded polyurethane foam of claim 9, wherein the multi-functional dialkyl phosphinate compound has the general formula (III):

(III)

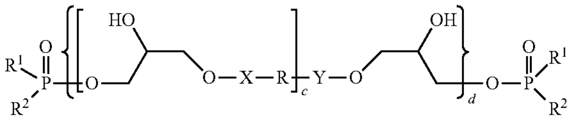

wherein $R^1$ and $R^2$ are individually selected from an alkyl group containing from 1 to 4 carbon atoms, R is a divalent linear or branched alkyl containing up to about 4 carbon atoms, or a bond, X and Y are each independently a divalent aryl group containing from 6 to 12 carbon atoms, the subscript c is 1, and the subscript d is an integer of from 1 to 26.

13. An article comprising the polyurethane foam of claim 9.

14. An article comprising the polyurethane foam of claim 11.

15. An article comprising the polyurethane foam of claim 12.

16. A method comprising the step of using the article of claim 13 in constructing and forming another article selected from the group consisting of furniture, automotive, boating, bus seating, train seating, RV seating, office furniture seating, aviation, tractor, bicycle, engine mount, compressor, bedding, insulation, sporting goods, shoe, carpet cushioning, packaging, textile, buffer cushioning, HVAC, tent, life raft, luggage, and hand bag articles.

17. The method of claim 16, wherein said another article is upholstered furniture.

18. The method of claim 16, wherein said another article is selected from the group consisting of automotive seat cushions, head linings and head rests, back cushions for automobiles and trucks, bus seating, vehicle seat bottom and back bolsters, armrests, support rings for run flat tires, and other automobile interior components.

19. The method of claim 16, wherein said another article is selected from the group consisting of mattresses and mattress tops.

20. The method of claim 16, wherein said another article is a sound insulation material.

21. The method of claim 16, wherein said another article is a roof insulation material.

22. A composition comprising:

(a) a multi-functional dialkyl phosphinate compound of the general formula (I):

(I)

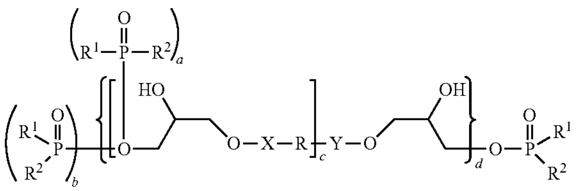

wherein each $R^1$ and $R^2$ are individually selected from an alkyl group containing from 1 to 4 carbon atoms, R is a divalent linear or branched alkyl containing up to about 4 carbon atoms, a divalent aralkyl group of from 7 to 13 carbon atoms, or a bond, X and Y are each independently a divalent aryl group containing from 6 to 12 carbon atoms, the subscripts a and b are each 0 or 1, the subscript c is an integer of from 1 to 5, and the subscript d is an integer from 1 to 26, with the provisos that:

$a+b=1$, when a=1, then b is 0, X is an aryl group as defined except that a hydrogen atom bonded to the aryl group is not part of the bracketed group of subscript c, and subscript c is an integer from 1 to 5 and subscript d is 1, and, when b=1, then a is 0, c is 1, and d is an integer of from 1 to 26; and, (b) a monohydroxyl dialkyl phosphinate compound.

23. A polyurethane foam comprising the composition of claim 22.

* * * * *